United States Patent [19]

Maltby, Jr.

[11] Patent Number: 5,090,987
[45] Date of Patent: Feb. 25, 1992

[54] APPARATUS FOR DELIVERING NEWLY FORMED GLASS SHEET STRIP

[75] Inventor: Robert E. Maltby, Jr., Wayne, Ohio

[73] Assignee: Glasstech, Inc., Perrysburg, Ohio

[21] Appl. No.: 671,502

[22] Filed: Mar. 19, 1991

[51] Int. Cl.⁵ ............................................ C03B 18/02
[52] U.S. Cl. .................................. 65/182.2; 65/182.3; 65/253
[58] Field of Search ................ 65/182.1, 182.3, 182.2, 65/100, 99.2, 253

[56] References Cited

U.S. PATENT DOCUMENTS

| | | | |
|---|---|---|---|
| 1,828,832 | 10/1931 | Drake | 65/182.3 |
| 3,137,556 | 6/1964 | Badger et al. | 65/182.3 |
| 3,223,506 | 12/1965 | Wheeler | 65/182.2 X |
| 3,300,291 | 1/1967 | Misson | 65/182.2 X |
| 3,407,011 | 10/1968 | Zeidler | 65/253 X |
| 3,506,422 | 4/1970 | Walters | 65/182.2 X |
| 3,885,943 | 5/1975 | Chui | 65/97 |
| 3,930,825 | 1/1976 | Chui | 65/62 |
| 4,081,260 | 3/1978 | Glikman et al. | 65/99.3 |
| 4,343,395 | 8/1982 | Lippert et al. | 65/253 X |
| 4,548,636 | 10/1985 | Nomaki et al. | 65/99.2 |

Primary Examiner—Robert L. Lindsay
Attorney, Agent, or Firm—Brooks & Kushman

[57] ABSTRACT

Apparatus (20) for delivering a newly formed floating glass sheet from a molten metal bath container (22) including a linear induction motor (24) that permits horizontal delivery without bath overflow is disclosed as including a gas support (34) and a drive roll (42) that cooperate with each other. The gas support (34) supports the horizontally delivered glass sheet strip by upwardly directed pressurized gas delivered between lateral edge portions (38) of the strip at a location immediately adjacent the bath container (22). The drive roll (42) is located downstream from the molten metal bath (24) and has spaced drive portions (44) that rotatively drive the lateral edge portions (38) of the glass sheet strip without the drive roll engaging the strip between the spaced drive portions. Gas support (34) preferably includes a first manifold (46) that supplies an upwardly directed inert gas and also preferably includes a second manifold (50) that supplies products of combustion from a gas burner. A pair of supports (64) of the apparatus adjustably support the drive portions (44) of the drive roll (42) and are adjustably positioned by horizontal and vertical adjusters (68,72) to provide steering and elevation adjustment. Pinch rolls (76) located above the drive portions (44) of the drive roll cooperate therewith to support and drive the lateral edge portions (38) of the glass sheet strip.

12 Claims, 2 Drawing Sheets

APPARATUS FOR DELIVERING NEWLY FORMED GLASS SHEET STRIP

TECHNICAL FIELD

This invention relates to apparatus for delivering a newly formed floating glass sheet strip from a molten metal bath within a bath container to an annealing lehr where the strip is annealed.

BACKGROUND ART

Forming of glass sheet strip has previously been done by both vertical and horizontal processing. In the vertical method such as disclosed by U.S. Pat. No. 1,828,832 Drake and U.S. Pat. No. 3,137,556 Badger et al, a molten glass strip is pulled upwardly and then turned approximately 90° over a horizontally extending roll so as to be delivered horizontally. In the horizontal method, a glass sheet strip is floated on a molten metal bath, normally tin, prior to movement upwardly out of the bath for delivery therefrom on rolls in a horizontal direction as disclosed by U.S. Pat. Nos. 3,885,943 Chui and 3,930,825 Chui. With both the vertical and horizontal glass sheet strip forming processes, it is thus necessary for the glass sheet strip to pass over a roll in its hot condition just after forming which is a disadvantage because the roll thus engages the hot glass when it is relatively soft and thereby reduces its optical quality and mechanical strength. More specifically, the vertical process requires the glass to pass over a roll in order to turn 90° for horizontal delivery as mentioned above, and the horizontal process requires the glass sheet to be bent upwardly by a roll so as to be delivered above an adjacent wall of the molten metal bath which is necessary in order to prevent the molten metal bath from spilling out adjacent the edge of the bath where the hot glass sheet strip is delivered.

In order to provide better quality glass, the horizontally float glass processing as disclosed by U.S. Pat. Nos. 4,081,260 Glikman et al and 4,548,636 Nomaki et al have utilized linear induction motors that exert an electromagnetic induction to the molten metal of the bath adjacent the edge thereof so that the glass sheet strip can remain horizontal adjacent the extremity of the bath without the molten metal spilling out of the bath container. In the U.S. Pat. No. 4,081,260 Glikman et al patent, the hot glass sheet strip is bent slightly upwardly adjacent the extremity of the bath container where inductors are located and is then supported by a device having nozzles for forming a gas cushion that delivers the hot glass sheet strip to an annealing kiln or lehr. In the U.S. Pat. No. 4,548,636 Nomaki et al patent, the side walls of the bath container are disclosed as being made of an electrically conductive material so as to maintain a uniform distribution of electromagnetic force applied to the molten metal bath across the width of the bath container extremity where the glass sheet strip is delivered horizontally outwardly from the bath container.

DISCLOSURE OF INVENTION

An object of the present invention is to provide improved apparatus for delivering a newly formed floating glass sheet strip from a molten metal bath.

In carrying out the above and other objects of the invention, the apparatus of this invention is constructed to deliver a newly formed floating glass sheet strip from a molten metal bath container to an annealing lehr where the strip is annealed. The bath container with which the apparatus is utilized includes a linear induction motor that permits the glass sheet strip to move horizontally without any vertical component from the molten metal bath without the bath overflowing the bath container. The apparatus includes a gas support for supporting the horizontally delivered glass sheet strip by upwardly directed pressurized gas delivered between lateral edge portions of the strip at a location immediately adjacent the bath container. A drive roll of the apparatus is located downstream from the molten metal bath and has spaced drive portions that rotatively drive the lateral edge portions of the glass sheet strip without the drive roll engaging the strip between the spaced drive portions. This construction permits the hot glass sheet to be supported at its edge portions without marking the center of the glass where the gas support prevents sagging of the glass sheet between the drive portions.

In the preferred embodiment disclosed, the apparatus is utilized with a bath container including an upper housing that encloses the molten metal bath which is tin. The gas support of the apparatus is disclosed as including a first manifold having an inert gas supply for supplying an upwardly directed inert gas that supports the glass sheet strip adjacent the bath container while supplying inert gas to the upper housing of the bath container in order to prevent forming of tin oxides. The gas support also preferably includes a second manifold for supplying upwardly directed pressurized gas that supports the glass sheet strip downstream from the first manifold. The inert gas supply as disclosed feeds hot nitrogen to the first manifold and the second manifold preferably includes a gas burner that feeds products of combustion thereto for upwardly directed flow to support the glass sheet strip.

In the preferred construction disclosed, the apparatus includes a pair of supports for adjustably supporting the drive portions of the drive roll. At least one of the pair of supports includes a horizontal adjuster for adjustably positioning the associated drive portion of the drive roll horizontally along the direction of movement of the glass sheet strip so that the strip is delivered in the desired direction. Between the pair of supports, the drive roll includes a central portion that extends between the drive portions of the drive roll and has a smaller size than the drive portions. The pair of supports also preferably include vertical adjusters for adjusting the vertical position of the drive portions between (a) start-up operation when the central portion of the drive roll supports the glass sheet strip and (b) steady state operation when the drive portions support the lateral edge portions of the glass sheet strip without the central portion of the drive roll engaging the glass sheet strip.

In the preferred construction, the apparatus also includes a pair of pinch rolls respectively located above the drive portions of the drive roll to engage with the upper surfaces of the lateral edge portions of the glass sheet strip.

The objects, features and advantages of the present invention are readily apparent from the following detailed description of the best mode for carrying out the invention when taken in connection with the accompanying drawings.

BEST MODE FOR CARRYING OUT THE INVENTION

Figure 1:
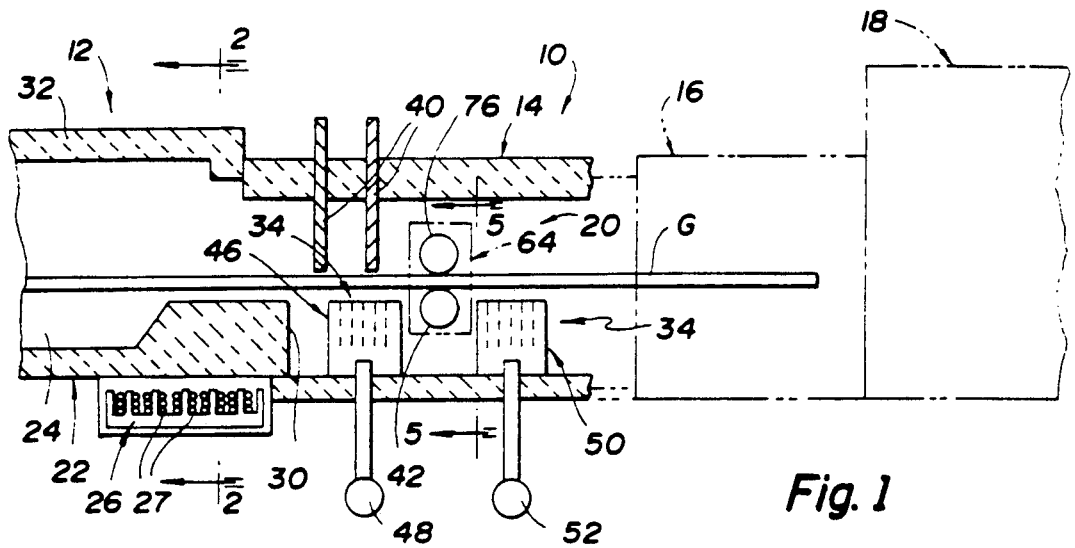
FIG. 1 is a schematic side elevational view taken partially in section to illustrate apparatus of the present invention for delivering a newly formed floating glass sheet strip from a molten metal bath to an annealing lehr.

With reference to FIG. 1 of the drawings, a glass sheet strip forming and processing system is generally indicated by 10 and is illustrated as including a forming station 12 for forming a hot glass sheet strip G, a delivery station 14 for delivering the glass sheet strip, a trimming station 16 for trimming the hot edges of the glass sheet strip, and an annealing lehr 18 where the hot glass sheet strip is annealed. As is hereinafter more fully described, the deliver station 14 includes apparatus 20 constructed in accordance with the present invention to provide delivery of the glass sheet strip G.

Figure 2:
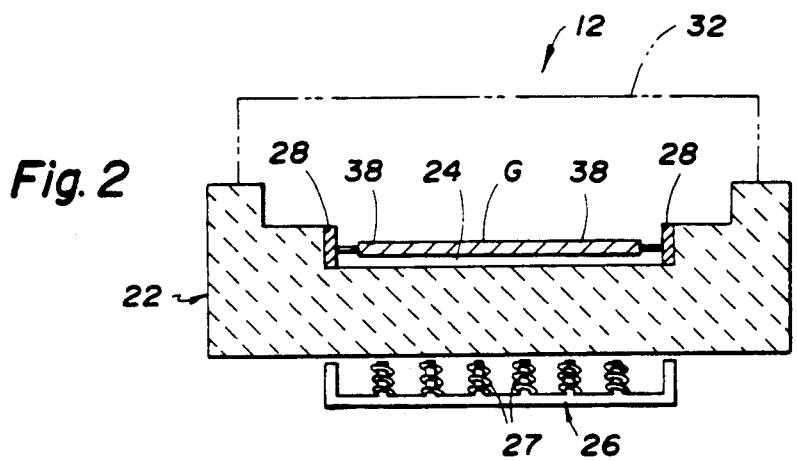
FIG. 2 is a cross-sectional view through the bath container with which the apparatus is utilized and illustrates the manner in which an electromagnetic inductor is incorporated to prevent the molten metal bath from spilling out of the bath container.

Forming station 12 illustrated in FIG. 1 includes a bath container 22 for a molten metal bath 24 on which the glass sheet strip G is floated just after being formed in any conventional fashion. A linear induction motor 26 of the bath container includes coils 27 for providing an electromagnetic force that prevents the molten metal bath 24 from spilling over the extremity 30 of the bath container where the glass sheet strip G is delivered while nevertheless permitting the glass sheet strip to be delivered horizontally without any bending. As illustrated, the linear induction motor 26 is located below the molten metal bath 24; however, it is also possible to position the linear induction motor above the molten metal bath such that it is thus located above the delivered glass sheet strip G. Furthermore, as illustrated in FIG. 2, the bath container 22 has electrically conductive side walls 28 so as to provide a uniform distribution of the electromagnetic force applied to the molten metal bath without any dropoff adjacent the side walls which would allow the molten metal bath to spill out of the bath container at the extremity 30 shown in FIG. 1. As is hereinafter more fully described, the molten metal bath 24 is preferably tin and the bath container 22 is made of a suitable refractory material and preferably has an upper housing 32 above the bath 24 and the floated glass sheet strip G supported by the bath.

Figure 3:
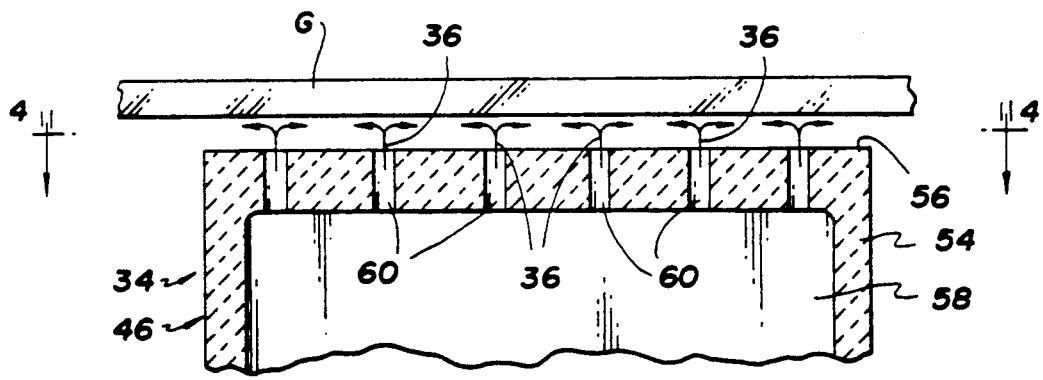
FIG. 3 is a sectional view taken in the same direction as FIG. 1 through a manifold of a gas support of the apparatus to illustrate the manner in which the glass sheet strip is supported after being delivered from the molten metal bath.

As illustrated by combined reference to FIGS. 1 and 3, the apparatus 20 of this invention includes a gas support 34 for supporting the horizontally delivered glass sheet strip G by upwardly directed pressurized gas that is illustrated by arrows 36 in FIG. 3. This upwardly directed pressurized gas is delivered to the glass sheet strip G between its lateral edge portions 38 (FIG. 2) at a location immediately adjacent the bath container extremity 30 shown in FIG. 1 where the glass sheet strip is delivered horizontally from the molten metal bath 24. Suitable walls or curtains 40 are located above the gas support 34 at this location to prevent entry of contaminated air or other gas into the upper housing 32 of the bath container.

As illustrated in FIG. 1, the apparatus 20 of this invention also includes a drive roll 42 located downstream from the molten metal bath 24. This drive roll 42 as illustrated by additional reference to FIG. 6 has spaced drive portions 44 that rotatively drive the lateral edge portions 38 of the glass sheet strip without the drive roll engaging the strip between the spaced drive portions.

As previously mentioned, the bath container 22 with which the apparatus 20 is utilized includes an upper housing 32 that encloses the molten metal bath 24 which is most preferably tin. Furthermore, the gas support 34 includes a first manifold 46 having an inert gas supply 48 for supplying upwardly directed inert gas that supports the glass sheet strip G adjacent the bath container 22 while supplying inert gas to the upper housing 32 of the bath container in order to prevent forming of tin oxides or dross at the upper surface of the bath. Furthermore, the gas support 34 also preferably includes a second manifold 50 for supplying upwardly directed pressurized gas that supports the glass sheet strip downstream from the first manifold 46.

Figure 4:
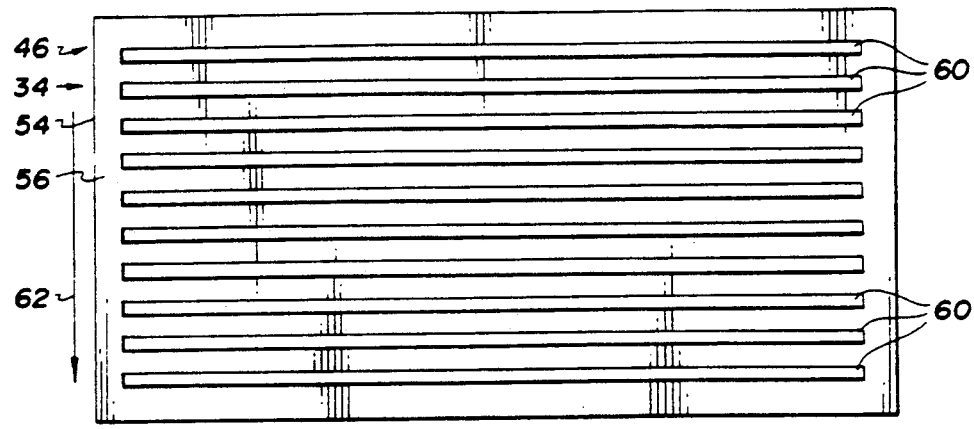
FIG. 4 is a top plan view taken along the direction of line 4—4 in FIG. 3 to further illustrate the construction of the manifold of the gas support.

In the preferred construction illustrated in FIG. 1, the inert gas supply 48 feeds hot nitrogen which may also be mixed with hydrogen to the first manifold 46 so as to provide an inert atmosphere within the upper bath container housing 32 in order to prevent the formation of tin oxides or dross at the surface of the molten metal bath 24. Furthermore, the second manifold 50 preferably includes a gas burner 52 that feeds pressurized products of combustion thereto for upwardly directed flow from the second manifold to support the glass sheet strip G downstream from the first manifold 46. Both of the manifolds have a construction as illustrated by the first manifold 46 shown in FIG. 3 which includes a manifold member 54 having an upper surface 56 and a pressurized gas plenum 58 that is communicated through openings 60 to supply the upwardly directed pressurized gas as illustrated by arrows 36. As shown in FIG. 4, the manifold openings 60 have elongated slit shapes that extend transversely with respect to the direction of delivery of the glass sheet strip as illustrated by arrow 62.

As shown in FIGS. 1 and 5 through 7, the apparatus 20 also includes a pair of supports 64 for adjustably supporting the drive portions 44 of the drive roll 42. More specifically, the ends 66 of the drive rolls are rotatably supported by the associated supports 64 and rotational driving is provided through suitable gearing in one or both of the supports so as to rotatively drive the drive roll 42. At least one of the supports 64, both of the supports as illustrated, includes a horizontal adjuster 68 for adjustably positioning the associated drive portion 44 of the drive roll 42 horizontally along the direction of movement of the glass sheet strip G. This horizontal adjustment provides steering control of the glass sheet strip in the bath 24 and as it is delivered to and through the trimming station 16 and the annealing lehr 18. When start-up operation is completed, there is normally no further need for providing the steering control. However, it is extremely important to provide the steering control so that the glass sheet strip G can be conveniently delivered in the proper direction during steady state operation.

Figure 5:
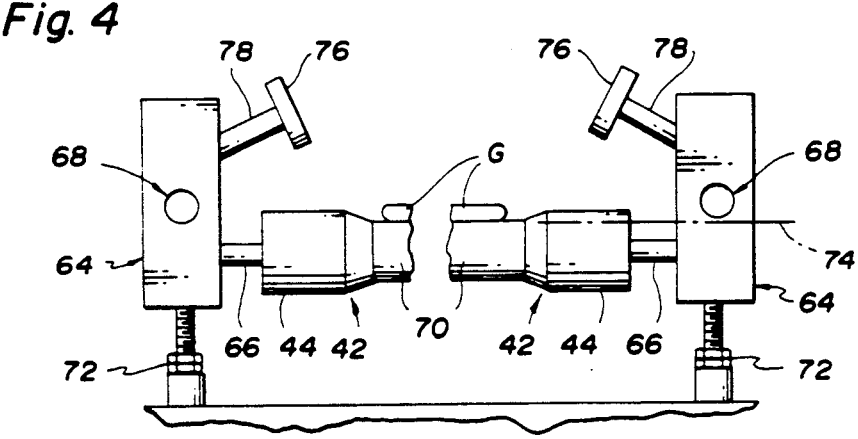
FIG. 5 is a broken away elevational view taken along the direction of line 5—5 in FIG. 1 to illustrate the construction of a drive roll of the apparatus with the drive roll illustrated during startup operation.
Figure 7:
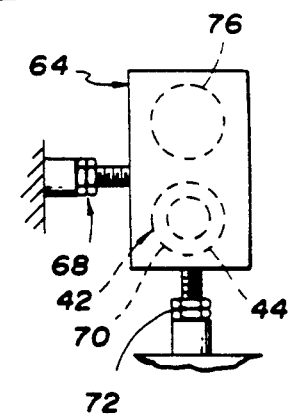
FIG. 7 is an elevational view taken along the direction of line 7—7 in FIG. 6 to illustrate horizontal and vertical adjusters for a drive roll support.
Figure 6:
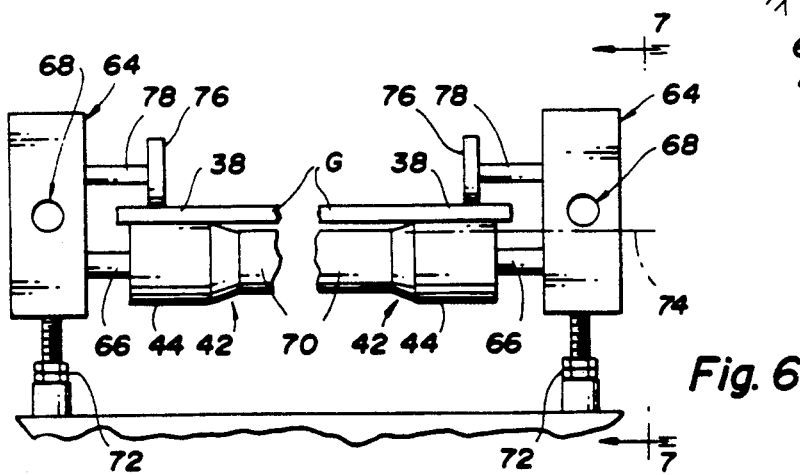
FIG. 6 is an elevational view similar to FIG. 5 showing the drive roll during steady state operation.

As illustrated in FIGS. 5 through 7, the drive roll 42 includes a central portion 70 that extends between the drive portions 42 and has a slightly smaller size than the drive portions, i.e. a radial difference approximately equal to the thickness of the conveyed glass sheet strip G during steady state operation as illustrated in FIG. 6. Furthermore, the pair of supports 64 include vertical adjusters 72 for adjusting the vertical position of the drive roll 42. During initial operation as illustrated in FIG. 5, the vertical adjusters 72 position the roll support 64 with the glass sheet strip G supported on the central drive roll portion 70 for delivery along a plane of delivery identified by reference line 74. After the glass sheet strip has been delivered sufficient long so as to reach steady state operation as shown by FIG. 6, the vertical adjusters 72 are moved downwardly so that the drive portions 44 of the drive roll 42 support the lateral edge portions 38 of the glass sheet strip along the same plane of delivery identified by reference line 74. The glass sheet strip G thus spans the gap between the drive roll portions 44 above the central portion 70 so that there is no engagement therewith and thus no potential of marking or otherwise destroying the optical quality or mechanical strength of the strip.

Both the horizontal adjusters 68 and the vertical adjusters 72 illustrated in FIGS. 5 through 7 preferably are constructed as threaded assemblies whose threading adjustment provides the modes of adjustment described above.

As illustrated in FIGS. 6 and 7, the apparatus 20 also preferably includes a pair of pinch rolls 76 respectively located above the drive portions 44 of the drive roll 42 to engage with the upper surfaces of the lateral edge portions 38 of the glass sheet strip G. Each of these pinch rolls 76 is rotatively mounted and driven by a suitable shaft 78 that extends from the associated support 64. These shafts 78 are mounted by the support 64 so as to be movable upwardly as illustrated in FIG. 5 during the start-up operation in order to permit the glass sheet strip G to spread laterally to the position of FIG. 6 for the steady state operation, and the pinch rolls 78 are then moved downwardly to engage the upper surfaces of the lateral edge portions 38 for the rotational driving in cooperation with the drive portions 44 of the drive roll 42.

While the best mode for carrying out the invention has been described in detail, those familiar with the art to which this invention relates will recognize various alternative designs and embodiments for practicing the invention as defined by the following claims.

What is claimed is:

1. In a glass sheet forming system including a bath container for containing a molten metal bath on which a newly formed glass sheet strip is floated, the bath container including a linear induction motor that permits the glass sheet to move horizontally from the molten metal bath without the bath overflowing the bath container, apparatus for delivering the newly formed glass sheet strip from the bath container, comprising:

a gas support for supporting the horizontally delivered glass sheet strip by upwardly directed pressurized gas delivered between lateral edge portions of the strip at a location immediately adjacent the bath container; and a drive roll located downstream from the molten metal bath and having spaced drive portion that rotatively drive the lateral edge portions of the glass sheet strip without the drive roll engaging the strip between the spaced drive portions.

2. Apparatus as in claim 1 wherein the bath container includes an upper housing that encloses the molten metal bath which is tin, the gas support including a first manifold having an inert gas supply for supplying an upwardly directed inert gas that supports the glass sheet strip adjacent the bath container while supplying inert gas to the upper housing of the bath container in order to prevent forming of tin oxides, and the gas support including a second manifold for supplying upwardly directed pressurized gas that supports the glass sheet strip downstream from the first manifold.

3. Apparatus as in claim 2 wherein the inert gas supply feeds nitrogen to the first manifold.

4. Apparatus as in claim 2 wherein the second manifold includes a gas burner that feeds products of combustion thereto for upward directed flow to support the glass sheet strip.

5. Apparatus as in claim 1 further including a pair of supports for adjustably supporting the drive portions of the drive roll.

6. Apparatus as in claim 5 wherein at least one of the pair of supports includes a horizontal adjuster for adjustably positioning the associated drive portion of the drive roll horizontally along the direction of movement of the glass sheet strip.

7. Apparatus as in claim 5 wherein the drive roll includes a central portion that extends between the drive portions and has a smaller size than the drive portions, and the pair of supports including vertical adjusters for adjusting the vertical position of the drive portions between (a) start-up operation when the central portion of the drive roll supports the glass sheet strip and (b) steady state operation when the drive portions support the lateral edge portions of the glass sheet strip without the central portion of the drive roll engaging the glass sheet strip.

8. Apparatus as in claim 5 wherein at least one of the pair of supports includes a horizontal adjuster for adjustably positioning the associated drive portion of the drive roll horizontally along the direction of movement of the glass sheet strip to provide a steering control, the drive roll including a central portion that extends between the drive portions and has a smaller size than the drive portions, and the pair of supports also including vertical adjusters for adjusting the vertical position of the drive portions between (a) start-up operation when the central portion of the drive roll supports the glass sheet strip and (b) steady state operation when the drive portions support the lateral edge portions of the glass sheet strip without the central portion of the drive roll engaging the glass sheet strip.

9. Apparatus as in claim 1, 5 or 8 further including a pair of pinch rolls respectively located above the drive portions of the drive roll to engage with the upper surfaces of the lateral edge portions of the glass sheet strip.

10. In a glass sheet forming system including a bath container for containing a molten metal bath on which a newly formed glass sheet strip is floated, the bath container having an upper housing and including a linear induction motor that permits the glass sheet strip to move horizontally from the molten metal bath without the bath overflowing the bath container, apparatus for delivering the newly formed glass sheet strip from the bath container, comprising:
- a gas support including a manifold and an inert gas supply that feeds the manifold to deliver an upwardly directed pressurized inert gas that supports the horizontally delivered glass sheet strip between lateral edge portions of the strip at a location immediately adjacent the bath container, and the inert gas being supplied from the manifold into the upper housing of the bath container to prevent contamination of the molten metal bath;
- a drive roll located downstream from the molten metal bath and having spaced drive portions that rotatively drive the lateral edge portions of the glass sheet strip without the drive roll engaging the strip between the spaced drive portions; and
- a pair of pinch rolls respectively located above the drive portions of the drive roll to engage with the lateral edge portions of the glass sheet strip.

11. In a glass sheet forming system including a bath container for containing a molten metal bath on which a newly formed glass sheet strip is floated, the bath container having an upper housing and including a linear induction motor that permits the glass sheet strip to move horizontally from the molten metal bath without the bath overflowing the bath container, apparatus for delivering the newly formed glass sheet strip from the bath container, comprising:
- a gas support including a first manifold and an inert gas supply that feeds the first manifold to deliver an upwardly directed pressurized inert gas that supports the horizontally delivered glass sheet strip between lateral edge portions of the strip at a location immediately adjacent the bath container, the inert gas being supplied from the manifold into the upper housing of the bath container to prevent contamination of the molten metal bath, the gas support also including a second manifold located downstream from the first manifold and having a gas burner whose products of combustion are pressurized and fed to the second manifold for upwardly directed flow therefrom to support the glass sheet strip downstream from the first manifold;
- a drive roll located downstream from the molten metal bath and having spaced drive portions that rotatively drive the lateral edge portions of the glass sheet strip without the drive roll engaging the strip between the spaced drive portions; and
- a pair of pinch rolls respectively located above the drive portions of the drive roll to engage with the lateral edge portions of the glass sheet strip.

12. In a glass sheet forming system including a bath container for containing a molten metal bath on which a newly formed glass sheet strip is floated, the bath container having an upper housing and including a linear induction motor that permits the glass sheet strip to move horizontally from the molten metal bath without the bath overflowing the bath container, apparatus for delivering the newly formed glass sheet strip from the bath container, comprising:
- a gas support including a first manifold and an inert gas supply that feeds the first manifold to deliver an upwardly directed pressurized inert gas that supports the horizontally delivered glass sheet strip between lateral edge portions of the strip at a location immediately adjacent the bath container, the inert gas being supplied from the manifold into the upper housing of the bath container to prevent contamination of the molten metal bath, and the gas support also including a second manifold located downstream from the first manifold and having a gas burner whose products of combustion are pressurized and fed to the second manifold for upwardly directed flow therefrom to support the glass sheet strip downstream from the first manifold;
- a drive roll located downstream from the molten metal bath and having spaced drive portions that rotatively drive the lateral edge portions of the glass sheet strip without the drive roll engaging the strip between the spaced drive portions, the drive roll also including a central portion that extends between the drive portions and has a smaller size than the drive portions;
- a pair of supports for adjustably supporting the drive portions of the drive roll, one of the pair of supports including a horizontal adjuster for adjustably positioning the associated drive portion of the drive roll horizontally along the direction of movement of the glass sheet strip to provide a steering control, and the pair of supports including vertical adjusters for adjusting the vertical position between start-up operation when the central portion of the drive roll supports the glass sheet strip and steady state operation when the drive portions support the lateral edge portions of the glass sheet strip without the central portion of the drive roll engaging the glass sheet strip; and
- a pair of pinch rolls respectively mounted by the pair of supports above the drive portions of the drive roll to engage with the lateral edge portions of the glass sheet strip.

* * * * *

UNITED STATES PATENT AND TRADEMARK OFFICE
CERTIFICATE OF CORRECTION

PATENT NO. : 5,090,987
DATED : February 25, 1992
INVENTOR(S) : Robert E. Maltby, Jr.

It is certified that error appears in the above-identified patent and that said Letters Patent is hereby corrected as shown below:

Column 6, Line 5, Claim 1 "portion" should read --portions--.

Signed and Sealed this

Twenty-first Day of September, 1993

Attest:

BRUCE LEHMAN

Attesting Officer  Commissioner of Patents and Trademarks